(12) United States Patent
Berlingieri et al.

(10) Patent No.: US 10,486,483 B2
(45) Date of Patent: Nov. 26, 2019

(54) LEAF SPRING SUSPENSION SYSTEM

(71) Applicant: Rassini Suspensiones, S.A. de C.V., Del. Miguel Hidalgo (MX)

(72) Inventors: Anthony Berlingieri, Plymouth, MI (US); James N. Zeimet, Commerce Township, MI (US)

(73) Assignee: RASSINI SUSPENSIONES, S.A. DE C.V., Del. Miguel Hidalgo (MX)

( * ) Notice: Subject to any disclaimer, the term of this patent is extended or adjusted under 35 U.S.C. 154(b) by 99 days.

(21) Appl. No.: 15/806,562

(22) Filed: Nov. 8, 2017

(65) Prior Publication Data
US 2018/0126815 A1 May 10, 2018

Related U.S. Application Data

(60) Provisional application No. 62/419,639, filed on Nov. 9, 2016.

(51) Int. Cl.
*B60G 11/10* (2006.01)
*B60G 11/04* (2006.01)

(52) U.S. Cl.
CPC .............. *B60G 11/10* (2013.01); *B60G 11/04* (2013.01); *B60G 2204/121* (2013.01)

(58) Field of Classification Search
CPC ....... B60G 11/04; B60G 11/10; B60G 11/107; B60G 11/113; B60G 11/12; B60G 11/125; B60G 2204/121; B60G 2202/112
See application file for complete search history.

(56) References Cited

U.S. PATENT DOCUMENTS

| | | | | |
|---|---|---|---|---|
| 1,362,037 A * | 12/1920 | Peterson | .............. | B60G 17/023 267/45 |
| 1,556,211 A * | 10/1925 | Fay | ........................ | B60G 11/04 267/2 |
| 1,587,871 A * | 6/1926 | Smith | ..................... | B60G 11/04 267/192 |
| 1,975,977 A * | 10/1934 | Russell | .................. | B60G 11/04 267/38 |
| 2,045,208 A * | 6/1936 | Stocq | ..................... | B60G 11/04 267/44 |
| 5,024,463 A * | 6/1991 | Oliver | .................. | B60G 17/023 267/260 |
| 8,490,992 B2 * | 7/2013 | Juriga | ...................... | B60G 9/02 280/124.163 |
| 8,668,215 B2 * | 3/2014 | Juriga | ................... | B60G 11/113 280/124.174 |
| 8,882,120 B2 * | 11/2014 | Juriga | ...................... | B60G 9/00 267/260 |
| 8,919,795 B2 * | 12/2014 | Juriga | ...................... | B60G 9/00 267/260 |
| 8,960,698 B2 * | 2/2015 | Juriga | ...................... | B60G 9/02 280/124.163 |

(Continued)

FOREIGN PATENT DOCUMENTS

WO    WO-2006121438 A2 * 11/2006  .......... B60G 11/113

*Primary Examiner* — Laura Freedman

(57) ABSTRACT

A leaf spring suspension system for a vehicle includes a chassis rail. Also included is a leaf spring fixedly coupled proximate a first end and proximate a second end of the leaf spring to the chassis rail. Further included is a half leaf spring fixedly coupled to the chassis rail proximate a first end of the half leaf spring and fixedly coupled to a vehicle axle proximate a second end of the half leaf spring.

7 Claims, 4 Drawing Sheets

(56) References Cited

U.S. PATENT DOCUMENTS

| | | | |
|---|---|---|---|
| 2014/0131972 A1* | 5/2014 | Juriga | B60G 11/113 |
| | | | 280/124.174 |
| 2015/0084302 A1* | 3/2015 | Juriga | B60G 9/00 |
| | | | 280/124.174 |
| 2018/0281541 A1* | 10/2018 | Berlingieri | F16F 3/023 |

* cited by examiner

LEAF SPRING SUSPENSION SYSTEM

CROSS-REFERENCE TO RELATED APPLICATIONS

This patent application claims priority to U.S. Provisional patent Application Ser. No. 62/419,639, filed Nov. 9, 2016, which is incorporated herein by reference in its entirety.

FIELD OF THE INVENTION

This invention relates generally to leaf spring suspension systems for vehicles.

BACKGROUND

Leaf spring systems have for many years been used for the suspension of wheeled vehicles. The central element of a leaf spring suspension system for a vehicle is termed a "semi-elliptical" spring configured as an arc-shaped length of spring steel having a substantially rectangular cross-section. At the center of the arc is provided an arrangement for coupling to the axle of the vehicle. At the ends are provided coupler holes for attaching the spring to the vehicle body. For heavy vehicles, leaf springs are stacked on one another to form layers of springs of different lengths. Leaf springs are still used in heavy commercial vehicles and railway carriages. In the case of very heavy vehicles, leaf springs provide the advantage of spreading the load over a larger region of the vehicle's chassis. A coil spring, on the other hand, will transfer the load to a single point.

The well-known Hotchkiss drive, the name of which derives from the French automobile firm of Hotchkiss, employs a solid axle that is coupled at its ends to the centers of respective semi-elliptical leaf springs. There are a number of problems with this form of drive arrangement. First, this drive system is characterized by high unsprung mass. Additionally, the use of a solid axle results in coupled left/right wheel motion. During heavy cornering and fast acceleration, this known system suffers from vertical deflection and wind-up.

One effort to address the problems associated with the Hotchkiss system employs a parallel leaf spring arrangement at each end of a solid axle. This known arrangement affords increased axle control, in the form of reduced power hop. Other advantages of this arrangement include roll under steer, auto load leveling to the gross vehicle weight, and no frame changes are required to convert from a Hotchkiss system. However, the parallel leaf spring arrangement employs a solid axle, and therefore does not provide the benefits of independent suspension. In addition, this arrangement is plagued with the disadvantage of high unsprung mass.

Accordingly, leaf spring suspension systems suffer from numerous drawbacks that may be improved upon.

SUMMARY OF THE INVENTION

According to one embodiment, a leaf spring suspension system for a vehicle includes a chassis rail. Also included is a leaf spring fixedly coupled proximate a first end and proximate a second end of the leaf spring to the chassis rail. Further included is a half leaf spring fixedly coupled to the chassis rail proximate a first end of the half leaf spring and fixedly coupled to a vehicle axle proximate a second end of the half leaf spring.

According to another embodiment, a leaf spring suspension system for a vehicle includes a chassis rail. Also included is a leaf spring fixedly coupled to the chassis rail proximate an end of the leaf spring. Further included is a half leaf spring fixedly coupled to the chassis rail proximate a first end of the half leaf spring and fixedly coupled to a vehicle axle proximate a second end of the half leaf spring. Yet further included is a hinge assembly operatively coupled to the leaf spring and to the vehicle axle, the hinge assembly rotatable about the vehicle axle during displacement of the leaf spring.

These and other advantages and features will become more apparent from the following description taken in conjunction with the drawings

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
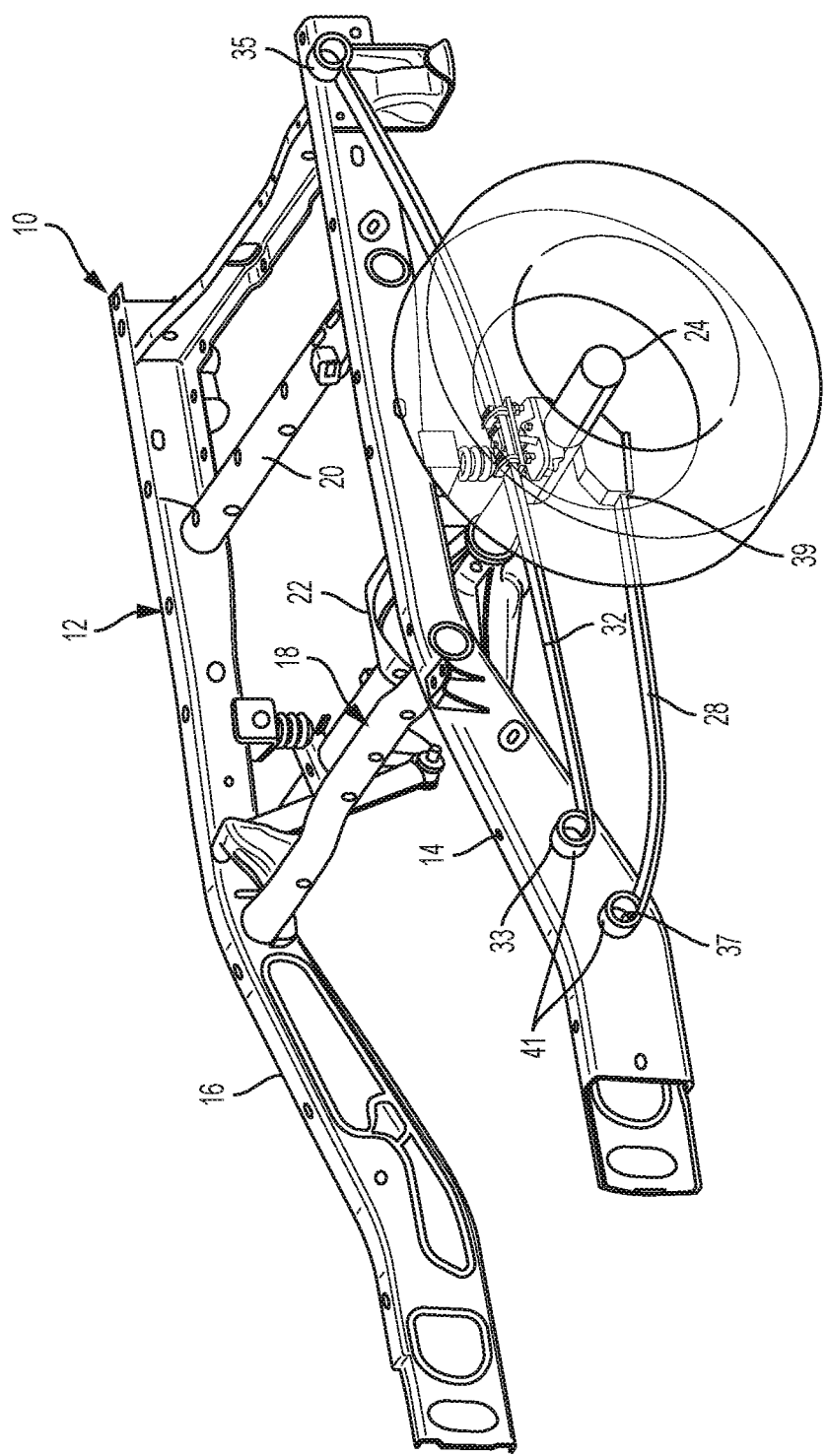
FIG. 1 is a perspective view of a vehicle suspension system.

Referring to FIG. 1, illustrated is a vehicle suspension system 10 having a chassis generally designated with numeral 12. The chassis 12 includes a first chassis rail 14 and a second chassis rail 16 that are arranged substantially parallel to each other. The first and second chassis rails 14, 16 are coupled to each another by at least one cross brace, such as a first cross brace 18 and a second cross brace 20, as shown. A differential drive arrangement 22 is fixedly coupled to the chassis 12 and converts the rotary motion of a drive shaft (not shown) to substantially orthogonal rotary motion at shaft 24. The shaft 24, also referred to as an axle herein, includes an associated pair of universal joints (not specifically designated) that are arranged to be proximal and distal with respect to the differential drive arrangement 22. Thus, the shaft 24 has an associated longitudinal axis to accommodate transaxial motion. It is to be appreciated that the shaft 24 refers to a pair of half shafts in some embodiments. The half shafts may be disposed within a single sleeve or uncovered.

Figure 2:
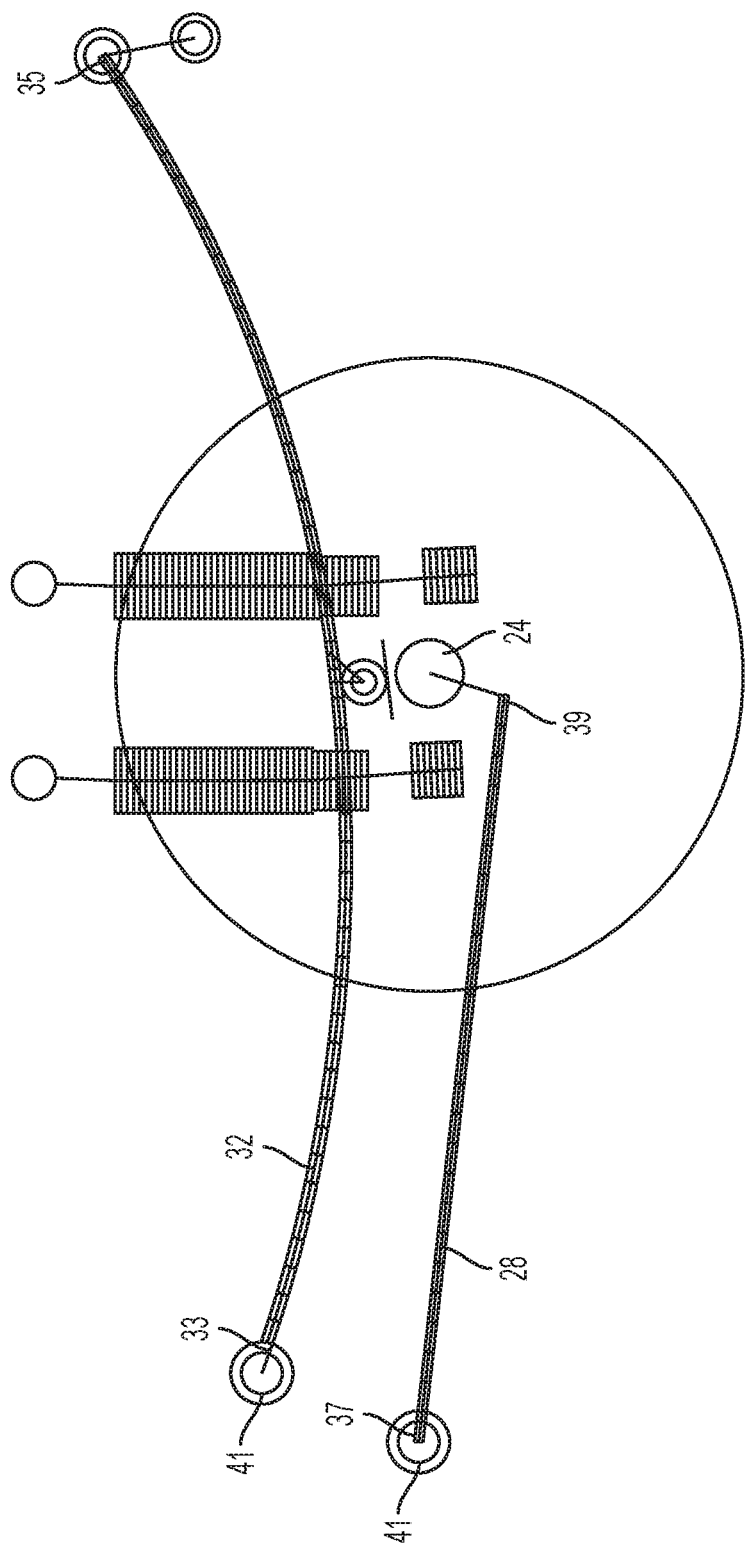
FIG. 2 is a side elevational view of a leaf spring arrangement of the vehicle suspension system.

Referring now to FIG. 2, the shaft 24 is operatively coupled at distal ends to respective half leaf springs, only one of which is illustrated and is referred to with numeral 28. Half leaf spring 28 is operatively coupled to the chassis rail 14 proximate a first end 37 of the half leaf spring and to the shaft 24 proximate a second end 39 of the half leaf spring. In particular, the half leaf spring 28 is coupled to the chassis rail 14 in a fixed manner with any suitable coupling element. In some embodiments, the half leaf spring 28 is coupled to the chassis rail 14 with an eye spring bushing arrangement 41. It is to be appreciated that multiple leaf springs may be disposed in a stacked arrangement to form what is referred to herein as the half leaf spring 28.

Disposed in spaced arrangement from the half leaf spring 28 is a leaf spring 32 operatively coupled at a first end 33 and a second end 35 to the chassis rail 14. In particular, the leaf spring 32 is coupled to the chassis rail 14 in a fixed manner with any suitable coupling element. In some embodiments, the leaf spring 32 is coupled to the chassis rail 14 with an eye spring bushing arrangement 41. As with the half leaf springs, the leaf spring 32 may refer to a plurality of leaf springs disposed in a stacked arrangement. As noted above, the leaf spring 32 is in spaced arrangement with the half leaf spring 28. In particular, although the leaf spring 32 is illustrated as being above the half leaf spring 28, the leaf spring 32 may be located below the half leaf spring 28 in some embodiments. For purposes of discussion, only leaf springs 28 and 32 have been described in detail, but it is to be appreciated that corresponding leaf springs are located on an opposing side of the chassis 12 proximate chassis rail 16.

The above-described springs, e.g., leaf springs 28 and 32 may be referred to as "semi-elliptical" springs configured as arc-shaped length segments. In some embodiments, the springs are formed of spring steel having a substantially rectangular cross-section. In other embodiments, a composite material may be used. However, alternative materials and geometries are contemplated.

The second end of the half leaf spring 28 is operatively coupled to the shaft 24 in a fixed manner. For example, a clamping component 29 may be included to exert a clamping force on the second end of the half leaf spring 28 to secure the half leaf spring 28 to the shaft 24. Alternatively, or in combination with the clamping component 29, one or more mechanical fasteners may secure the second end of the half leaf spring 28 to the clamping component 29 and/or the shaft 24.

Fixed mounting of the leaf springs 28, 32 to the chassis rail 14 and of the half leaf spring 28 to the shaft 24 facilitate various connection location options. Adjustment of the mounting location of the half leaf spring 28 to the chassis rail 14 to modify the orientation of the half leaf spring 28, in combination with flexibility with how many springs are stacked to form the overall half leaf spring 28, allow for control of the windup of the leaf spring arrangement and stiffness of the overall leaf spring arrangement.

Figure 3:
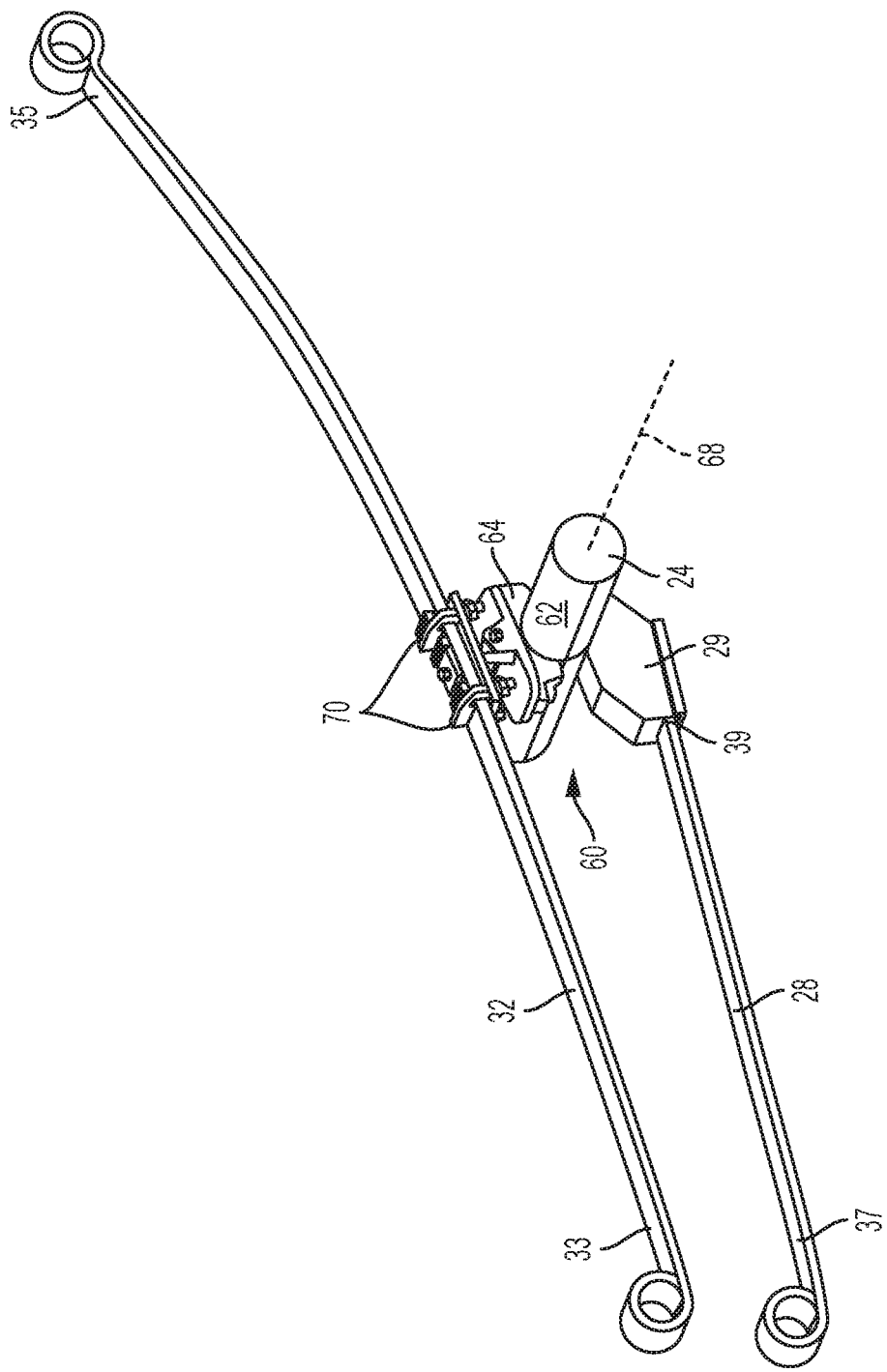
FIG. 3 is a perspective view of the leaf spring arrangement.
Figure 4:
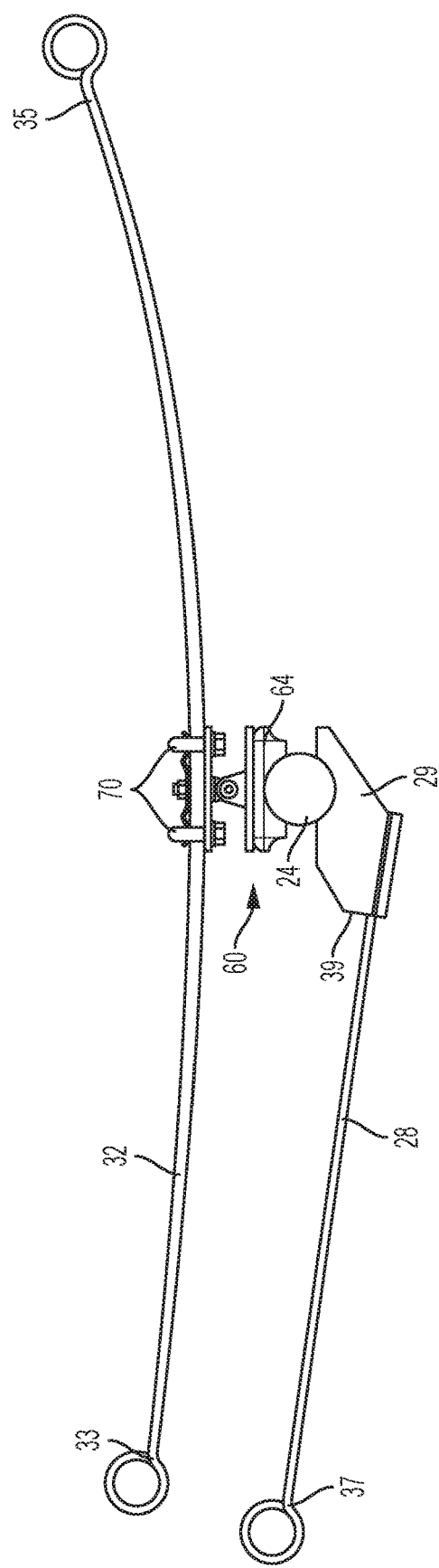
FIG. 4 is a side elevational view of the leaf spring arrangement illustrating a hinge assembly.

Referring now to FIGS. 3 and 4, another aspect of the invention is illustrated. In particular, some embodiments of the vehicle suspension system 10 include a hinge assembly 60 operatively coupled to the leaf spring 32. During operation of the vehicle suspension system 10, and particularly during the acceleration and braking operations described in detail above, the leaf spring 32 undergoes stress in response to flexure of the leaf spring 32. To alleviate the stress associated with such operation, the hinge assembly 60 is provided.

The hinge assembly 60 provides stress relief for the leaf spring 32 by rotating about an outer surface 62 of the axle 24 to which the hinge assembly 60 is mounted. In some embodiments, the hinge assembly 60 is a revolute joint formed by the axle 24 and hinge component 64 that is mounted to the axle 24. In such embodiments, the revolute joint provides single-axis rotation about an axis 68 of the axle 48. The hinge assembly 60 also includes at least one fastening structure, such as the pair of mechanical fasteners 70, to operatively couple the hinge assembly 60 to the leaf spring 32. The pair of mechanical fasteners 70 each at least partially wrap around the leaf spring 32 to secure the leaf spring 32 to the hinge assembly 60.

Although the invention has been described in terms of specific embodiments and applications, persons skilled in the art may, in light of this teaching, generate additional embodiments without exceeding the scope or departing from the spirit of the invention described herein. Accordingly, it is to be understood that the drawing and description in this disclosure are proffered to facilitate comprehension of the invention, and should not be construed to limit the scope thereof.

Having thus described the invention, it is claimed:

1. A leaf spring suspension system for a vehicle comprising:
   a chassis rail;
   a leaf spring fixedly coupled to the chassis rail proximate an end of the leaf spring;
   a half leaf spring fixedly coupled to the chassis rail proximate a first end of the half leaf spring and fixedly coupled to a vehicle axle proximate a second end of the half leaf spring; and
   a hinge assembly operatively coupled to the leaf spring and to the vehicle axle, the hinge assembly rotatable about the vehicle axle during displacement of the leaf spring, wherein the half leaf spring is positioned above the leaf spring.

2. The leaf spring suspension system of claim 1, wherein the hinge assembly comprises a revolute joint.

3. The leaf spring suspension system of claim 1, wherein the half leaf spring is fixedly coupled to the chassis rail with an eye spring bushing that is coupled to the chassis rail.

4. The leaf spring suspension system of claim 1, wherein the leaf spring is fixedly coupled to the chassis rail with an eye spring bushing that is coupled to the chassis rail.

5. The leaf spring suspension system of claim 1, wherein the half leaf spring is fixedly coupled to the axle with a clamping component.

6. The leaf spring suspension system of claim 1, wherein the half leaf spring and the leaf spring are spaced from each other.

7. The leaf spring suspension system of claim 1, wherein the leaf spring is fixedly coupled proximate a first end and proximate a second end of the leaf spring to the chassis rail.

* * * * *